US007302179B2

(12) United States Patent
Alavie et al.

(10) Patent No.: US 7,302,179 B2
(45) Date of Patent: Nov. 27, 2007

(54) OPTICAL PERFORMANCE MONITOR USING CO-LOCATED SWITCHABLE FIBER BRAGG GRATING ARRAY

(75) Inventors: Tino Alavie, Thornhill (CA); Keith Beckley, King (CA); Stephen Leonard, Unionville (CA); Ming Gang Xu, Toronto (CA)

(73) Assignee: Novx Systems, Inc., Markham, ON (CA)

( * ) Notice: Subject to any disclaimer, the term of this patent is extended or adjusted under 35 U.S.C. 154(b) by 742 days.

(21) Appl. No.: 10/714,451

(22) Filed: Nov. 17, 2003

(65) Prior Publication Data

US 2005/0105902 A1 May 19, 2005

(51) Int. Cl.
*H04B 10/08* (2006.01)
(52) U.S. Cl. .............................. 398/34; 398/84; 398/87
(58) Field of Classification Search ................ 398/26, 398/34, 82, 84, 87
See application file for complete search history.

(56) References Cited

U.S. PATENT DOCUMENTS

| 5,305,083 | A | | 4/1994 | Marianik et al. | |
|---|---|---|---|---|---|
| 5,457,760 | A | * | 10/1995 | Mizrahi | 385/37 |
| 5,579,143 | A | * | 11/1996 | Huber | 398/72 |
| 5,793,508 | A | * | 8/1998 | Meli | 398/87 |
| 6,310,703 | B1 | | 10/2001 | Alavie et al. | |
| 6,353,690 | B1 | * | 3/2002 | Kulishov | 385/10 |
| 6,504,976 | B1 | | 1/2003 | Polynkin et al. | |
| 6,510,256 | B1 | | 1/2003 | Asseh et al. | |
| 2002/0012144 | A1 | * | 1/2002 | Lin et al. | 359/130 |
| 2002/0176134 | A1 | * | 11/2002 | Vohra | 359/127 |
| 2004/0197097 | A1 | * | 10/2004 | Downie et al. | 398/27 |

OTHER PUBLICATIONS

Tuesday Morning, OFC '97 Technical Digest, 2 pages.
High Resolution Fiber Grating Optical Network Monitor, Koeppen et al., 6 pages, Lucent Technologies, 600 Mountain Ave., Murray Hill, NJ 07974, C. Koeppen: 732 748-7442, koeppen@lucent.com.

* cited by examiner

*Primary Examiner*—Christina Leung
(74) *Attorney, Agent, or Firm*—Lynn C. Schumacher; Hill & Schumacher (57) ABSTRACT

The present invention provides methods and devices for optical performance monitoring using co-located switchable fiber Bragg gratings (FBGs) in conjunction with a few detectors. This arrangement combines the merit of both tunable FBG filters and discrete detectors to achieve high spectral resolution, fast detection process and great dynamic range. By using parallel co-located FBGs in conjunction with a banded architecture, the tuning range of each FBG becomes much smaller (equivalent of ~0.08% strain). As a result, not only does the update speed of the spectral characteristics for each channel become much faster, but it effectively eliminates the concern of FBG long-term reliability as well.

29 Claims, 8 Drawing Sheets

OPTICAL PERFORMANCE MONITOR USING CO-LOCATED SWITCHABLE FIBER BRAGG GRATING ARRAY

FIELD OF THE INVENTION

The present invention relates to methods and apparatuses for monitoring the optical performance in wavelength division multiplexed fiber optical networks.

BACKGROUND OF THE INVENTION

In a wavelength division multiplexed (WDM) fiber optic system, an optical signal with combined different wavelengths is simultaneously launched into a single optical fiber through an optical multiplexer. At the receiving end, each wavelength is separated and routed to individual detectors via an optical demultiplexer. WDM technology has proven to be a popular cost-effective means for increasing the carrying capacity (or bandwidth) over a single optical fiber. As the number of wavelengths (or channels) on fiber optic networks increases together with the increase of the optical network complexity, monitoring and management of such a network at the optical layer becomes increasingly more important such that the spectral characteristics of each wavelength (or channel) at key nodes in the network must be determined and analyzed in real-time. The spectral information such as channel identification, power and optical signal-to-noise ratio (OSNR) can be used for the purpose of channel inventory monitoring, real-time system error warning/alarming and signal conditioning. Not only can optical performance monitoring (OPM) serve as a vital diagnosis tool, it also provides useful feedback for controlling certain functions of optical network elements such as reconfigurable optical add/drop multiplexers (ROADM) and dynamic gain equalizers (DGE). The in-service (i.e. no interruption of data stream) optical measurement provides network operators with a fast and reliable estimate of the expected quality of service (QoS) offered to the digital clients.

While there exist a number of approaches that directly accomplish optical spectral analysis, they can be generally grouped into two configurations: (1) a tunable narrowband filter coupled with single broadband detector and (2) a fixed dispersive element followed by a detector array. The combination of these two configurations is also common.

A traditional optical spectral analyzer employs a rotating (i.e. tunable) diffraction grating so that the wavelengths are scanned across the output slit and detected by a single broadband detector. While it provides high resolution, it requires very sensitive control over rotation of the grating, resulting in a slow scanning speed and high cost.

Examples of conventional tunable narrowband filters are tunable Fabry-Perot (F-P) etalons and acousto-optic tunable filters (AOTF). The Fabry-Perot etalon is typically tuned by varying the mirror spacing whereas the AOTF is scanned by changing the RF drive frequency. The free spectral range (FSR) of a Fabry-Perot etalon presents an ambiguity problem particularly in the presence of multiple wavelengths. In addition, while both these tunable filters offer faster response time, the filter shape (and rejection ratio) remains undesirable for practical use. Last but not least, the mechanical and optical requirements imposed on F-P etalon and AOTF for achieving high stability and accuracy make these devices excessively costly.

Examples of fixed dispersive elements are commonly diffraction gratings and optical demultiplexers (e.g. arrayed waveguide gratings, and dielectric filters). In this case, input light is decomposed into its constituent wavelengths, with an appropriate resolution, and then relative intensity of each wavelength is measured using detector array (Polynkin et al., U.S. Pat. No. 6,504,976). The same concept has also been demonstrated using a blazed fiber Bragg grating (FBG). The fundamental limitation of this kind of approach is that it is very difficult to extract accurate OSNR information for tight channel spacing. One of the drawbacks of using an optical demultiplexer as the dispersive element is that the power measurement is prone to errors when there is thermal-wavelength drift of the spectral element due to the fact that optical demultiplexer gives a set of fixed discrete channels with a predefined frequency interval (channel spacing).

Alternatively, since a detector array is usually expensive, particularly for high spatial resolution, a tunable spatial filter (acting as a wavelength selector) can be used between the dispersive element and a single detector (Marianik et al., U.S. Pat. No. 5,305,083). Such apparatus may include micro shutters, micro mercury switches, an array of micro electromechanical mirrors or a liquid crystal display array. One of the interesting features of this hybrid configuration is that it turns a conventional scanning monochromator into a random access monochromator.

Another example of tunable narrowband filters 22 is tunable fiber Bragg gratings (FBGs). Since the filter is an in-fiber device, it has many distinct advantages over traditional bulk optical components. These include low insertion loss, low polarization dependent loss, low polarization mode dispersion and so on. What is more, an FBG offers near-ideal filter characteristics for the purpose of selecting a single channel and rejecting all others (Alavie et al., U.S. Pat. No. 6,310,703). The common means of tuning an FBG are based on applying mechanical strain and temperature. However, temperature tuning is less attractive due to the slow thermal response and high temperature required. To cover the entire C or L spectral band, strain tuning suffers from the fact that it requires excessively high strain (~3%) so that long-term reliability of the fiber itself becomes a concern. It is also a nontrivial task to mechanically tune an FBG over such a wide spectral range without compromising the tuning speed.

Another FBG-based method of creating and tuning a narrow bandpass filter involves the interaction between a traveling acoustic pulse and a broadband-chirped FBG (Asseh et al., U.S. Pat. No. 6,510,256). Since different wavelengths are reflected at different physical portions of the grating, a narrow transmission window is spectrally opened wherever the longitudinal acoustic pulse is present within the stop-band of the grating due to the temporary collapse of the local Bragg coupling condition. However, there are a few technical difficulties. Firstly the chirped FBG must be very strong (i.e. long grating length and high reflectivity) in order to achieve good channel isolation. Secondly a very high speed and precision electronics circuit has to be used in order to capture the acoustic pulse. Finally coupling of the acoustic pulse into fiber requires tight and delicate control. Solving these technical issues usually means associated high cost.

Since the efficiency and cost of operation of optical networks are becoming increasingly important, what is needed is a cost-effective design for the practical use of optical performance monitoring.

SUMMARY OF THE INVENTION

The present invention provides a new method and devices for optical performance monitoring using co-located switchable fiber Bragg gratings (FBGs) in conjunction with a few detectors. This arrangement combines the merit of both tunable FBG filters and discrete detectors to achieve high spectral resolution, fast detection process and great dynamic range. By using parallel co-located FBGs in conjunction with a banded architecture, the tuning range of each FBG becomes much smaller (equivalent of ~0.08% strain). As a result, not only does the update speed of the spectral characteristics for each channel become much faster, but it effectively eliminates the concern of FBG long-term reliability as well. Finally, the integrated design provides for superior optical characteristics, can be produced at lower cost, and is generally more compact.

In one aspect of the invention there is provided an optical performance monitor, comprising:

a first length of optical fiber having a fiber Bragg grating array of spatially-separated co-located fiber Bragg gratings, each co-located fiber Bragg grating including at least two fiber Bragg gratings, each of the at least two fiber Bragg gratings having a different associated Bragg wavelength written at the same physical location in the first length of optical fiber;

an optical branching device having an input port being optically coupled to input optical signals contained in a pre-selected number of wavelength bands, each wavelength band containing a pre-selected number of wavelength channels, the optical branching device having a first circulating port being optically coupled to a first end of the first length of optical fiber, a second end of the length of optical fiber being a low reflection termination;

an optical band demultiplexer having an input optically coupled to an output port of the optical branching device and multiple outputs corresponding to the number of wavelength bands with each output being optically coupled to an associated detector;

tuning means attached to each co-located fiber Bragg grating for inducing a pre-selected amount of change in both fiber Bragg grating period and refractive index shifting the associated Bragg wavelengths of each of the at least two fiber Bragg gratings in each co-located fiber Bragg grating to coincide with an associated pre-selected wavelength channel from each wavelength band such that each of the at least two fiber Bragg gratings of the pre-selected co-located fiber Bragg grating reflects its associated pre-selected wavelength channel back to the optical branching device, wherein when the co-located fiber Bragg gratings are tuned to an "off" state the input wavelength channels are routed from the optical branching device into the first end of the first length of optical fiber through the fiber Bragg grating array and terminated at the second end of the fiber Bragg grating array, and wherein when a pre-selected co-located fiber Bragg grating is tuned to an "on" state to coincide with its pre-selected wavelength channels, each of the at least two fiber Bragg gratings of the pre-selected co-located fiber Bragg grating reflects these input wavelength channels back through the optical branching device and lunched into the optical band demultiplexer, when outputted from the optical band demultiplexer, these reflected wavelength channels are directed into their associated detectors, whereupon the wavelength channels of each wavelength band are interrogated to determine pre-selected properties of the input optical signals, wherein the co-located fiber Bragg gratings are tuned to the "on" state one at a time so that all wavelength channels are reflected to the associated detector in a time-division manner.

In another aspect of the present invention there is provided an optical performance monitor, comprising:

a) a optical isolator having an input optically coupled to input optical signals contained in a pre-selected number of wavelength bands, each wavelength band containing a pre-selected number of wavelength channels, the optical isolator having an output optically coupled to a input of an optical band demultiplexer, the optical band demultiplexer having multiple outputs with each output being optically coupled to a multiple input port/single output port optical switch for passing a pre-selected wavelength band of input wavelength channels;

b) an optical branching device having an input port optically coupled to the single output port of the optical switch, the optical branching device having a first circulating port being optically coupled to a first end of a first length of optical fiber, the optical branching device having an output port optically coupled to a detector;

c) the first length of optical fiber having a fiber Bragg grating array of spatially-separated co-located fiber Bragg gratings, each co-located fiber Bragg grating including at least two fiber Bragg gratings, each of the at least two fiber Bragg gratings having a different associated Bragg wavelength written at the same physical location in the first length of optical fiber, the first length of optical fiber having a second end being a low reflection termination;

d) tuning means attached to each co-located fiber Bragg grating for inducing a pre-selected amount of change in both fiber Bragg grating period and refractive index for shifting the associated Bragg wavelengths of each of the at least two fiber Bragg gratings in each co-located fiber Bragg grating to coincide with an associated pre-selected input wavelength channel from each wavelength band such that each of the at least two fiber Bragg grating of the pre-selected co-located fiber Bragg grating reflects its associated pre-selected wavelength channel back through the optical branching device;

e) wherein when the co-located fiber Bragg gratings are tuned to an "off" state the input optical signals are routed from the optical branching device into the first end of the first length of optical fiber through the fiber Bragg grating array and terminated at the second end of the fiber Bragg grating array, f) wherein for each pre-selected band, a pre-selected co-located fiber Bragg grating is tuned to reflect wavelength channels one at a time back through the first coupling port and out through the output port of the optical branching device into the detector whereupon the wavelength channel is interrogated to determine pre-selected properties of the wavelength channel, without inter-band cross talk;

g) and wherein step f) is repeated for each of the pre-selected number of spatially-separated co-located fiber Bragg gratings; and h) repeating steps f) and g) for each of the pre-selected number of wavelength bands until all the wavelength channels are detected.

In another aspect of the invention there is provided an optical performance monitor, comprising:

an optical isolator having an output optically coupled to an input of a means for demultiplexing the input optical signals into a pre-selected number of wavelength bands, each wavelength band containing a pre-selected number of wavelength channels, the optical isolator having an input optically coupled to the input optical signals, the means for demultiplexing the optical signals having a number of outputs equal to the pre-selected number of wavelength bands with each output being optically coupled into an associated optical branching device, each optical branching device having a first circulating port being optically coupled to a first end of an associated length of optical fiber, each optical branching device having an output port optically coupled to an associated detector;

each length of optical fiber having a fiber Bragg grating array including a the same number of spatially-separated fiber Bragg gratings, each of the fiber Bragg gratings having a different associated Bragg wavelength, the length of optical fiber having a second end being a low reflection termination;

tuning means attached to each of the spatially-separated fiber Bragg gratings for inducing a pre-selected amount of change in both fiber Bragg grating period and refractive index in each fiber Bragg grating for shifting the associated Bragg wavelengths of each of the fiber Bragg gratings among a pre-selected number (L) of positions, wherein when a pre-selected fiber Bragg grating in each length of optical fiber is switched to coincide with a pre-selected wavelength channel, the pre-selected wavelength channels in each fiber are reflected back through the optical branching device attached to each length of optical fiber and out through its output port into the associated detector connected thereto, whereupon the wavelength channels of each wavelength band are interrogated to determine pre-selected properties of the optical signals, wherein each spatially-separated fiber Bragg grating in different optical fibers but in the same corresponding fiber positions is attached to a common tuning means such that all the fiber Bragg gratings in the same corresponding fiber positions are switched at the same time.

In another aspect of the invention there is provided a method of monitoring optical performance of optical signals in an optical fiber, comprising the steps of:

a) directing optical signals contained in a pre-selected number of wavelength bands into an optical branching device and into a first length of optical fiber coupled thereto, each wavelength band containing a pre-selected number of wavelength channels, the first length of optical fiber having a fiber Bragg grating array including a pre-selected number (M) of spatially-separated co-located fiber Bragg gratings, each co-located fiber Bragg grating including a pre-selected number (K) of fiber Bragg gratings at least equal to the pre-selected number of wavelength bands, each of the pre-selected number (K) of fiber Bragg gratings having a different associated Bragg wavelength written at the same physical location in the first length of optical fiber and each Bragg wavelength of the (K) fiber Bragg grating being tunable among a pre-selected number (L) of wavelength positions, the first length of optical fiber having a second end being a low reflection termination;

b) tuning both the period and refractive index of a pre-selected co-located fiber Bragg grating for shifting the associated Bragg wavelengths of each of the pre-selected number of fiber Bragg gratings into one of the (L) wavelength positions to coincide with an associated pre-selected input wavelength channel from each wavelength band such that each fiber Bragg grating of the pre-selected co-located fiber Bragg grating reflects its associated pre-selected wavelength channel back through the optical branching device, and c) demultiplexing the reflected pre-selected wavelength channels and simultaneously detecting the reflected pre-selected input wavelength channels from each wavelength band and interrogating the detected wavelength channels to determine pre-selected properties of the optical signals;

d) repeating steps b) and c) L-1 additional times until L wavelength channels in each wavelength band have been reflected back through the optical branching device; and e) repeating steps b), c) and d) for each of the pre-selected number (M) of spatially-separated co-located fiber Bragg gratings until all the wavelength channels (N), given by N=MKL are detected.

In another aspect of the invention there is provided a method of monitoring optical performance of optical signals in an optical fiber, comprising the steps of:

a) demultiplexing optical signals contained in a pre-selected number of wavelength bands, each wavelength band containing a pre-selected number of wavelength channels;

b) directing demultiplexed optical signals from one of the pre-selected wavelength bands into an optical branching device and into a first length of optical fiber coupled thereto, each wavelength band containing a pre-selected number of wavelength channels, the first length of optical fiber having a fiber Bragg grating array including a pre-selected number (M) of spatially-separated co-located fiber Bragg gratings, each co-located fiber Bragg grating including a pre-selected number (K) of fiber Bragg gratings at least equal to the pre-selected number of wavelength bands, each of the pre-selected number (K) of fiber Bragg gratings having a different associated Bragg wavelength written at the same physical location in the first length of optical fiber and each Bragg wavelength of the (K) fiber Bragg grating being tunable among a pre-selected number (L) of wavelength positions, the first length of optical fiber having a second end being a low reflection termination;

c) tuning both the period and refractive index of one of the pre-selected number (K) of fiber Bragg gratings in one of the pre-selected number (M) of spatially-separated co-located fiber Bragg gratings for shifting the associated Bragg wavelength of the pre-selected fiber Bragg grating into one of the (L) wavelength positions to coincide with an associated pre-selected wavelength channel from the pre-selected wavelength band such that the pre-selected fiber Bragg grating of the pre-selected co-located fiber Bragg grating reflects the associated pre-selected wavelength channel back through the optical branching device, and detecting the reflected pre-selected wavelength channel and interrogating the detected wavelength channel to determine pre-selected properties of the optical signals contained therein;

d) repeating step c) L-1 additional times until all L wavelength channels in the pre-selected wavelength band have been reflected back through the optical branching device;

e) repeating steps c) and d) for each of the pre-selected number (M) of spatially-separated co-located fiber Bragg gratings; and f) repeating steps b), c) d) and e) for each of the pre-selected number of wavelength bands until all the wavelength channels (N), given by N=MKL, are detected.

In another aspect of the present invention there is provided a method of monitoring optical performance of optical signals in an optical fiber, comprising the steps of:

a) demultiplexing optical signals into a pre-selected number (K) of wavelength bands, each wavelength band containing a pre-selected number of wavelength channels;

b) directing the demultiplexed wavelength channels from each of the pre-selected number (K) wavelength bands into an associated optical branching device and into a length of optical fiber coupled thereto, each length of optical fiber having a fiber Bragg grating array including the same number of spatially-separated number of fiber Bragg gratings, each of the fiber Bragg gratings having a different associated Bragg wavelength and being tunable among a pre-selected number (L) of wavelength positions with each wavelength position coinciding with an associated pre-selected wavelength channel from the wavelength band routed into the length of optical fiber such that each fiber Bragg grating reflects its (L) pre-selected wavelength channels back through the optical branching device attached thereto, the length of optical fiber having a second end being a low reflection termination;

c) tuning both the period and refractive index of one of the fiber Bragg gratings in each of the optical fibers for shifting the associated Bragg wavelength of each fiber Bragg grating to coincide with an associated pre-selected wavelength channel from the pre-selected wavelength band such that the pre-selected fiber Bragg grating reflects the associated pre-selected wavelength channel back through its associated optical branching device, and detecting the reflected pre-selected wavelength channel from each wavelength band and interrogating the detected wavelength channels to determine pre-selected properties of the optical signals contained therein;

d) repeating step c) L-1 additional times until L wavelength channels in the pre-selected wavelength band in each length of optical fiber has been reflected back through the optical branching device; and e) repeating steps c) and d) for each of the spatially-separated Bragg gratings in each length of optical fiber until all the wavelength channels have been detected;

f) repeating steps b), c) d) and e) for each of the pre-selected number (K) of wavelength bands until all the wavelength channels (N), given by N=MKL, are detected, wherein each spatially-separated fiber Bragg grating in different optical fibers but in the same corresponding fiber positions is attached to a common tuning means such that all the fiber Bragg gratings in the same corresponding fiber positions are switched at the same time.

In another aspect of the present invention there is provided an optical performance monitor, comprising:

an optical isolator having an output optically coupled to an input of a means for optically splitting the input optical signals, the optical isolator having an input optically coupled to the input optical signals, the means for splitting the optical signals having a number of outputs equal to a pre-selected number of wavelength bands, each wavelength band containing a pre-selected number of wavelength channels, with each output of said means for optically splitting the input optical signals being optically coupled into an associated optical branching device, each optical branching device having a first circulating port being optically coupled to a first end of an associated length of optical fiber, each optical branching device having an output port optically coupled to an associated detector;

each length of optical fiber having a fiber Bragg grating array including the same number of spatially-separated fiber Bragg gratings, each of the fiber Bragg gratings having a different associated Bragg wavelength, the length of optical fiber having a second end being a low reflection termination;

tuning means attached to each of the spatially-separated fiber Bragg gratings for inducing a pre-selected amount of change in both fiber Bragg grating period and refractive index in each fiber Bragg grating for shifting the associated Bragg wavelengths of each of the fiber Bragg gratings among a pre-selected number (L) of positions, wherein when a pre-selected fiber Bragg grating in each length of optical fiber is switched to coincide with a pre-selected wavelength channel, the pre-selected wavelength channels in each fiber are reflected back through the optical branching device attached to each length of optical fiber and out through its output port into the associated detector connected thereto, whereupon the wavelength channels of each wavelength band are interrogated to determine pre-selected properties of the optical signals, wherein each fiber Bragg grating has a pre-selected out-of-band rejection ratio, and wherein each spatially-separated fiber Bragg grating in different optical fibers but in the same corresponding fiber positions is attached to a common tuning means such that all the fiber Bragg gratings in the same corresponding fiber positions are switched at the same time.

In another aspect of the present invention there is provided a method of monitoring optical performance of optical signals in an optical fiber, comprising the steps of:

a) optically splitting optical signals into a number of outputs equal to a pre-selected number (K) of wavelength bands, each wavelength band containing a pre-selected number of wavelength channels;

b) directing the optically splitted wavelength channels into an associated optical branching device and into a length of optical fiber coupled thereto, each length of optical fiber having a fiber Bragg grating array including the same number of spatially-separated number of fiber Bragg gratings, each of the fiber Bragg gratings having a different associated Bragg wavelength and being tunable among a pre-selected number (L) of wavelength positions with each wavelength position coinciding with an associated pre-selected wavelength channel from the wavelength band routed into the length of optical fiber such that each fiber Bragg grating reflects its (L) pre-selected wavelength channels back through the optical branching device attached thereto, the length of optical fiber having a second end being a low reflection termination;

c) tuning both the period and refractive index of one of the fiber Bragg gratings in each of the optical fibers for shifting the associated Bragg wavelength of each fiber Bragg grating to coincide with an associated pre-selected wavelength channel from the pre-selected wavelength band such that the pre-selected fiber Bragg grating reflects the associated pre-selected wavelength channel back through its associated optical branching device, and detecting the reflected pre-selected wavelength channel from each wavelength band and interrogating the detected wavelength channels to determine pre-selected properties of the optical signals contained therein;

d) repeating step c) L-1 additional times until L wavelength channels in the pre-selected wavelength band in each length of optical fiber has been reflected back through the optical branching device; and e) repeating steps c) and d) for each of the spatially-separated Bragg gratings in each length of optical fiber until all the wavelength channels have been detected;

f) repeating steps b), c) d) and e) for each of the pre-selected number (K) of wavelength bands until all the wavelength channels (N), given by N=MKL, are detected, wherein each spatially-separated fiber Bragg grating in different optical fibers but in the same corresponding fiber positions is attached to a common tuning means such that all the fiber Bragg gratings in the same corresponding fiber positions are switched at the same time.

The present invention overcomes the drawbacks and limitations associated with the prior art and provides a much improved method and apparatus for optical performance monitoring. The forgoing and other objectives, features and advantages of the present invention will become more apparent in light of the detailed description of exemplary embodiments thereof, as illustrated in the accompanying drawings set forth below.

BRIEF DESCRIPTION OF THE DRAWINGS

The method and device for optical performance monitoring that forms the present invention will now be described below.

DETAILED DESCRIPTION OF THE INVENTION

Some embodiments of the present invention use one or more arrays of co-located fiber Bragg gratings spatially separated one or more optical fibers, together with an optical branching device and a zero-skipped banded demultiplexer architecture to accurately provide wavelength, power, and OSNR measurement on a per channel basis in a rapid manner. In another embodiment of the method and apparatus several optical fibers have an array of spatially separated fiber Bragg gratings which are co-switched. The methods and apparatuses forming the present invention allow for speedy analysis of the optical spectrum and content by sequentially switching the co-located FBG array such that the spectral content of each channel can be measured by a small number of detectors through a banded filter.

Each co-located FBG acts as a multiple narrowband filter that scans through a predefined wavelength range to obtain spectral information including channel identity (ID), power and optical signal to noise ratio (OSNR). The spectral location of each co-located FBG with respect to the zero-skipped banded demultiplexer is arranged in such a way that at any given time, there will be only one channel present at each detector during the scan. Thus, by repeatedly switching each co-located FBG, the entire spectral information across the C or L band is obtained and updated continuously.

Generally speaking, any apparatus designed to effectively change the period and index of refraction of a fiber Bragg grating and hence the Bragg wavelength can be regarded as tuning means. The underlying tuning mechanism involves applying effective physical field around a fiber Bragg grating. While the switching mechanism of the co-located FBGs can involve the application of either strain or temperature, a preferred approach in this case would be to attach a piezoelectric element along the fiber that contains each co-located FBG. The detailed transduction mechanism has been disclosed in co-pending U.S. patent application Ser. No. 10/193,686 entitled "Random Access Optical Add/Drop Switch", which is incorporated herein in its entirety. It can be readily appreciated that the unique benefit of using co-located FBGs is that multiple narrowband filters can be scanned simultaneously by actuating a single piezoelectric element.

The method of monitoring optical performance of optical signals in an optical fiber comprises directing optical signals contained in a pre-selected number of wavelength bands into an optical branching device and into a first length of optical fiber coupled thereto. Each wavelength band contains a pre-selected number of wavelength channels. The first length of optical fiber has a fiber Bragg grating array including a pre-selected number (M) of spatially-separated co-located fiber Bragg gratings. Each co-located fiber Bragg grating includes a pre-selected number (K) of fiber Bragg gratings at least equal to the pre-selected number of wavelength bands, each of the pre-selected number (K) of fiber Bragg gratings having a different associated Bragg wavelength written at the same physical location in the first length of optical fiber. Each Bragg wavelength of the (K) fiber Bragg grating is tunable among a pre-selected number (L) of wavelength positions. The first length of optical fiber has a second end which is a low reflection termination. Both the period and refractive index of a pre-selected co-located fiber Bragg grating are tuned for shifting the associated Bragg wavelengths of each of the pre-selected number of fiber Bragg gratings into one of the (L) wavelength positions to coincide with an associated pre-selected input wavelength channel from each wavelength band such that each fiber Bragg grating of the pre-selected co-located fiber Bragg grating reflects its associated pre-selected wavelength channel back through the optical branching device. The method includes demultiplexing the reflected pre-selected wavelength channels which are then detected whereupon the wavelength channels from each wavelength band are interrogated to determine pre-selected properties of the optical signals. The step of tuning is repeated L times until all L wavelength channels in each wavelength band have been reflected back through the optical branching device. The procedure is repeated for each of the pre-selected number (M) of spatially-separated co-located fiber Bragg gratings until all the wavelength channels (N), given by N=MKL are detected. The pre-selected properties of the wavelength channels which are determined during the interrogation stage include wavelength channel identification, wavelength channel power and wavelength channel optical-signal-to-noise-ratio.

Figure 1:
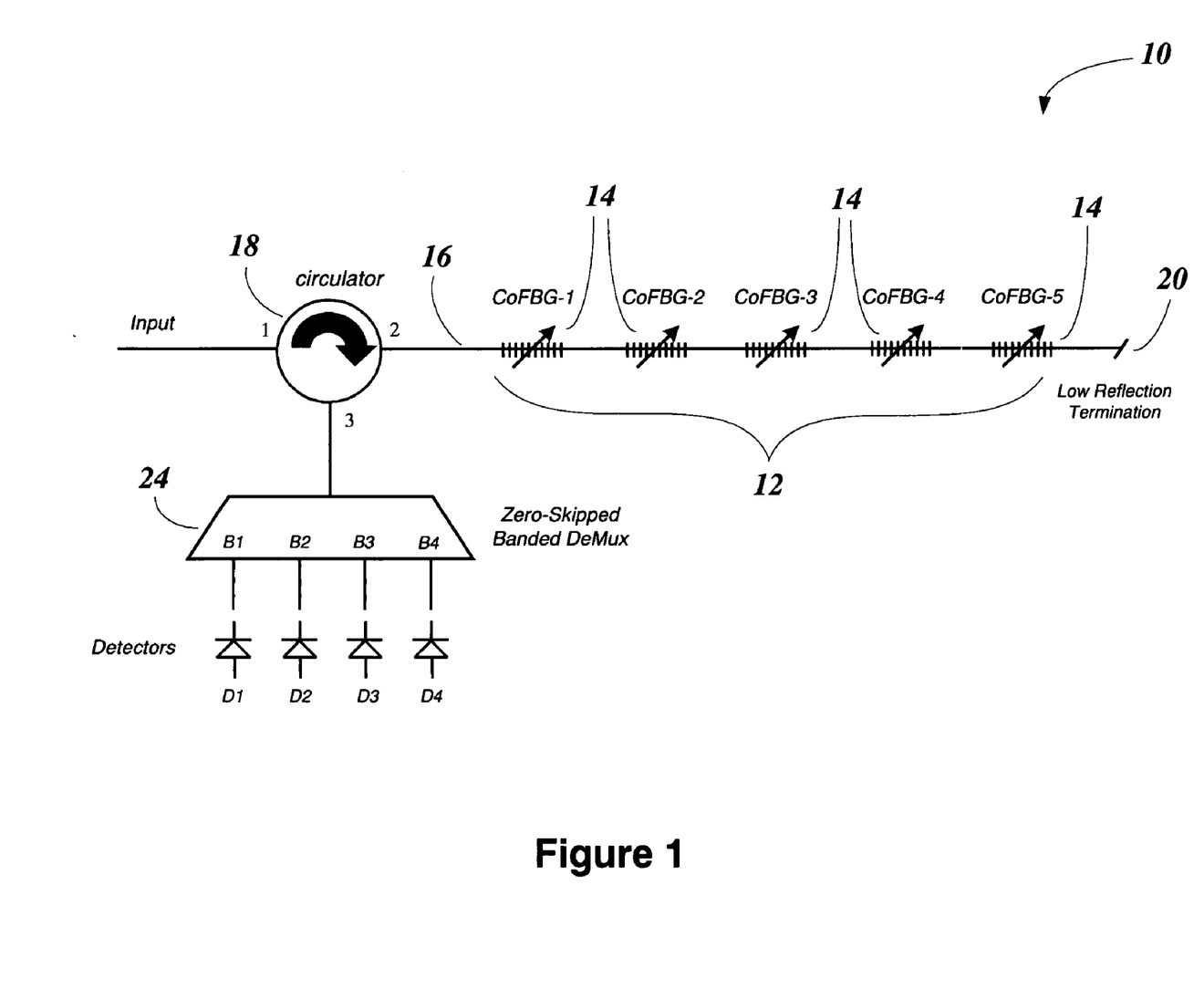
FIG. 1 is an optical schematic showing a preferred embodiment for the optical performance monitoring using a co-located fiber Bragg grating array in conjunction with a banded architecture.

The method can be accomplished using an apparatus such as shown in FIG. 1. In the example of FIG. 1, M=5, K=4, L=2 and hence MKL=N=40. A wavelength division multiplexed (WDM) signal at the input end of optical circuit 10 is routed to a switchable co-located FBG array 12 of spatially separated individual co-located located fiber Bragg gratings 14 located in a first length of optical fiber 16 via an optical branching device such as the optical circulator 18 shown which is connected to the first end of the optical fiber. In the array 12 of spatially-separated co-located fiber Bragg gratings in fiber 16 shown in FIG. 1, each co-located fiber Bragg grating 14 includes four individual fiber Bragg gratings written into the same spatial position in the fiber 16 with each of the fiber Bragg gratings having a different associated Bragg wavelength. The length of optical fiber 16 has a second end 20 which is a low reflection termination. It is noted that the number of fiber Bragg gratings 14 written into each position in fiber 16 may be two or more in this embodiment using co-located gratings.

When the co-located FBGs 14 are in the "off" state (or inter-channel park position), the input signal travels through the gratings and is terminated at the end 20 of the grating array. Upon being switched on to coincide with a channel position, however, each co-located FBG 14 will reflect (i.e. redirect) one wavelength (i.e. channel) at a time, through the same optical circulator 18, to one of the four detectors (D1, D2, D3, D4) via a banded demultiplexer 24. The multiple outputs of demultiplexer 24 are connected to an associated detector D1, D2, D3 and D4. By sequentially switching each co-located FBG 14 in the grating array 12, all channels will be reflected to the corresponding detector in a time-division manner. In addition, by still using discrete detectors a greater dynamic range can be measured than with the detector-array.

Figure 2:
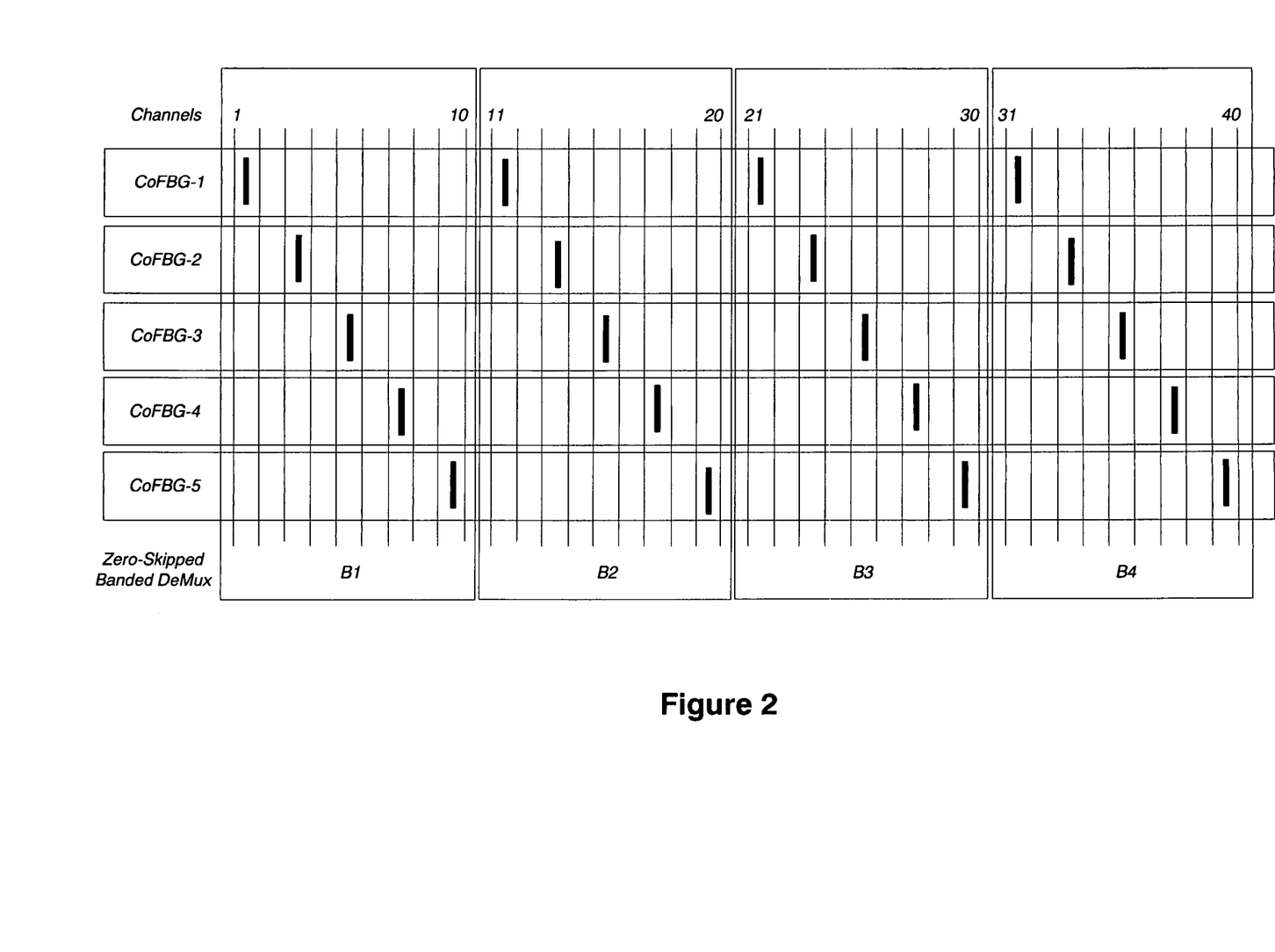
FIG. 2 is a graphical representation showing how the optical performance monitor measures spectral characteristics using a co-located FBGs array and a banded architecture.

FIG. 2 is a graphical representation that depicts the operating principle of the optical performance monitor based on using the co-located FBG array and a banded architecture. A 40-channel system (a typical 100 GHz WDM system over the C band) is assumed as a specific example here. The channel positions are indicated by each vertical dotted line whereas the co-FBG wavelength positions are shown as each vertical bar. Thus, the channel spacing is conveniently shown as the spacing between each vertical dotted line. For the sake of clarity, only the beginning and end of channel numbers within each band are shown. Each co-located FBG 14 consists of four individual FBGs with certain spectral separation (in this example, equivalent to 10-channel spacing). In addition each co-located FBG is spectrally offset by a certain amount (in this case, equivalent to 2-channel spacing). Furthermore, each individual FBG within each co-located FBG addresses two WDM channels by switching forward and backward one half of the channel spacing. In other words, each co-located FBG 14 covers 8 channels and hence an array of five co-located FBGs covers the entire 40 channels. Referring to FIG. 2, the first co-located FBG 14, CoFBG-1, addresses channels 1 and 2, 11 and 12, 21 and 22, 31 and 32. The second co-located FBG, CoFBG-2 addresses channels 3 and 4, 13 and 14, 23 and 24, 33 and 34, and so on.

As each co-located FBG 14 is attached to a single switch mechanism, the four individual gratings within each co-located FBG 14 will be tuned at the same time. For example, when CoFBG-1 is switched to the blue position (i.e. lower wavelength side of the FBG park wavelength), channels 1, 11, 21 and 31 will be reflected towards detectors. On the other hand, when CoFBG-1 is switched to the red position (i.e. longer wavelength side of the FBG park wavelength), channels 2, 12, 22, and 32 will be reflected towards the detectors. To avoid the cross talk within each collocated FBG at each switch position, a zero-skipped banded demultiplexer is used before the detectors. As further shown in FIG. 2, unlike a conventional demultiplexer that separates input signal on a per channel basis, the banded demultiplexer 24 separates input signal on a banded basis, with each band passing a group of channels. Four pass bands are shown in this example (B1, B2, B3 and B4) with each band covering 10 channels. A zero-skipped banded demultiplexer means that there is no roll-off region between the band pass filters. Stated differently, the slope of the filter edge is so steep that there is no transit region between each band. This is especially important when the channel spacing becomes even narrower.

Since one of the four individual FBGs of each co-located FBG 14 falls within each of the four pass bands of the banded demultiplexer, by switching each co-located FBG sequentially, each detector connected to each output of the banded multiplexer sees only one channel that corresponds to that band simultaneously. At any given time, there is only one co-located FBG being switched to correspond to one channel position in each band and the rest of the co-located FBGs remain in their respective park positions. For example, when CoFBG-1 is switched to its blue position, the first detector, D1, sees channel 1; the second detector, D2, sees channel 11; the third detector, D3, sees channel 21 and the fourth detector, D4, sees channel 31. Next, CoFBG-1 is switched to the red position, D1 sees channel 2, D2 sees channel 12, D3 sees channel 22 and D4 sees channel 32. Now the same switching pattern is sequentially repeated on CoFBG-2, CoFBG-3, CoFBG-4 and CoFBG-5.

As noted above, when each individual FBG is being switched between its adjacent channels, the channel power and noise level between the channels can be measured. Therefore, the channel power, channel ID and hence OSNR can be calculated. However, care must be taken to properly design the spectral response of each grating within each co-located FBG such that power measurement errors are kept to a minimum, especially for an OSNR measurement with a low noise floor. In this particular embodiment, it is clear that the noise level measurement is achieved on a per band basis. Since the noise level variation within each band is usually small, the noise level of each channel can be well represented by the average noise level within the band.

Nevertheless, a more accurate determination of the spectral noise profile can be obtained by taking multiple measurements using individual FBGs within the band at different noise floor measurement positions. This is possible since each in-band FBG can be tuned to address multiple noise floor measurement positions. With reference to FIG. 2, the first grating of CoFBG-1 is shown at the location where the noise level between channel 1 and channel 2 can be measured. The same grating can be tuned to reside between channel 2 and 3. Clearly, the noise floor difference, if any, between channel 1 and channel 2 can be determined. Thus by measuring the noise level variation between all neighboring channels, the overall noise profile within each band (and hence the entire C band) can be achieved.

According to the current architecture, if the total wavelength channel number in the system is N, the design flexibility is such that one can choose to have M switchable grating arrays, K co-located gratings in each array (and hence K detectors) and L switchable positions (i.e. addressable channels) per individual grating provided that the product of M, L and K is greater than or equal to N. In the example shown in FIGS. 1 and 2, M=5, K=4, L=2 and hence MKL=N=40. This inherent design flexibility can be very useful when it is desired to have a good balance among many practical factors such as the cost, manufacturability and overall performance including scan time.

Figure 3:
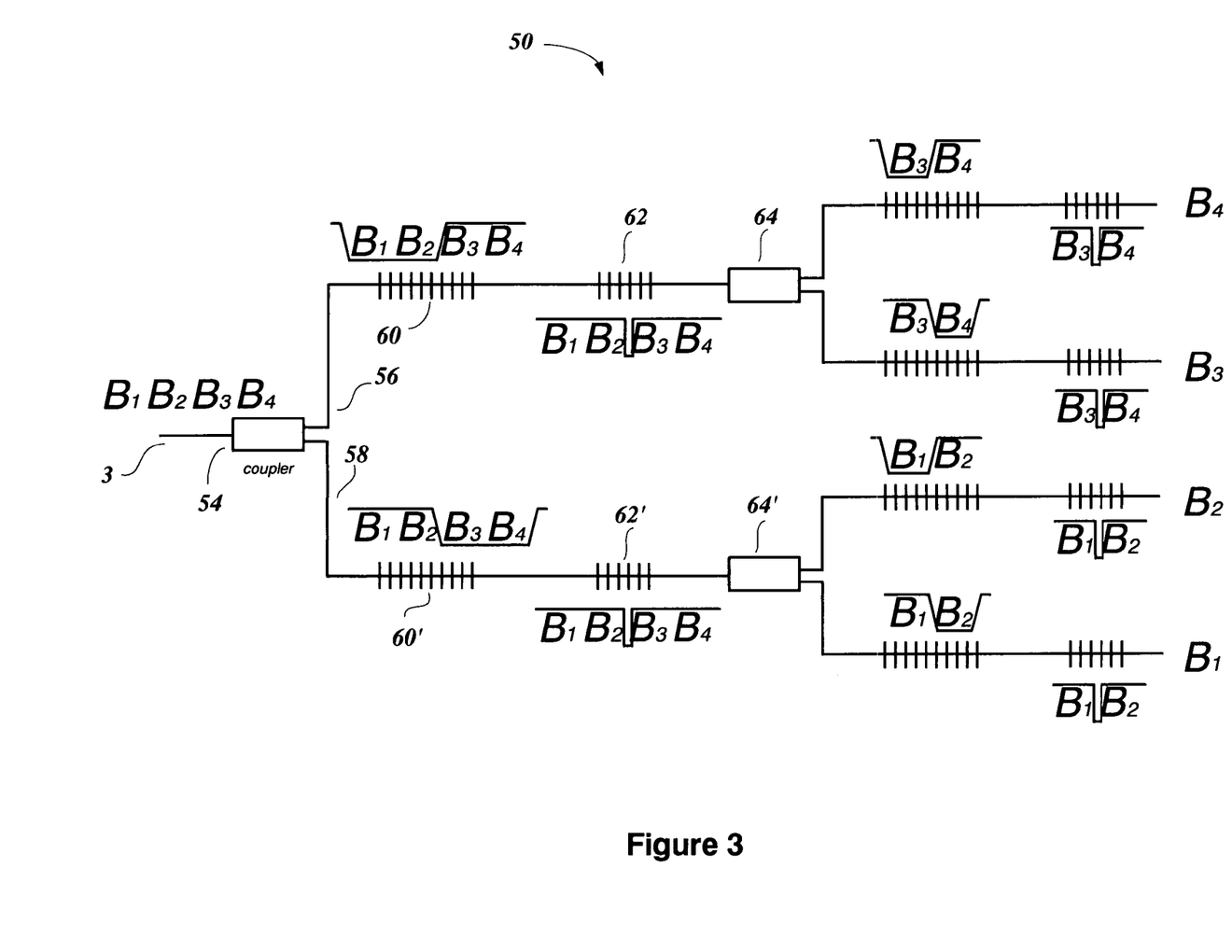
FIG. 3 is a schematic illustration of a preferred embodiment for implementing a zero-skipped banded demultiplexer for the purpose of optical performance monitoring.

FIG. 3 illustrates an example of a construction of a zero-skipped banded demultiplexer shown generally at 50. In this instance, it comprises an optical coupler 54 connected to the optical fiber from output 3 of the optical circulator. The branched fiber output 56 from coupler 54 includes a broadband FBG 60 and a narrowband FBG 62 in conjunction with the output of the narrowband FBG 62 being input into an associated fiber optic coupler 64. The broadband FBG 60 serves as band rejecter (or band splitter) whereas a narrowband FBG provides a sharp filtering edge. Four bands (B1, B2, B3 and B4) input to the demultiplexer are made available at the two separate branches (56 and 58) via the first coupler 54. The top branch 56 reduces the input bands to B3 and B4 by first rejecting bands B1 and B2 followed by the sharpening at the band split point (i.e. between B2 and B3). Similarly, the bottom branch 58 reduces the input bands to B1 and B2 using broadband FBG 60' as band rejecter (or band splitter) whereas narrowband FBG 62' provides a sharp filtering edge. The output of narrowband FBG 62' is input into an associated fiber optic coupler 64'. The same rejection/sharpening process is repeated at the second coupler stage with the two outputs of couplers 64 and 64' until four individual bands are completely separated at the output. In order to provide a smooth bandpass spectral response, particularly when the desired pass band is located at short wavelength side of the band splitting filters and band sharpening filters, it is necessary to keep the cladding mode loss of these grating pairs to a minimum.

It will be appreciated that the fiber branched structure of the zero-skipped banded demultiplexer 50 of FIG. 3 is only illustrative and while preferred for the specific case of demultiplexing four wavelength bands, other architectures may be used. For example, if there were eight (8) bands to be demultiplexed then each of the free ends of the fibers attached to couplers 64 and 64' would be optically coupled to an optical coupler to again split the remaining bands in each branch, and so on.

In another embodiment the band demultiplexer can include a fiber optic filter array having a 1×K optic splitter having an input connected to the output port of the optical branching device and K output branches each having all pre-selected wavelength bands routed therein. K is also the number of wavelength bands. Each of the K output branches would include a broadband fiber Bragg grating to transmit one of the wavelength bands and reflect all remaining wavelength bands followed by a narrowband fiber Bragg grating to provide a sharp filtering edge so that substantially square zero-skipped filtering is achieved at a boundary between the transmitted wavelength band and the reflected wavelength bands. Each of the K output branches is optically coupled to one of the associated detectors, and each of the K output branches transmits a different wavelength band than all the other K output branches so that all wavelength bands are output from the optical band demultiplexer.

Figure 4:
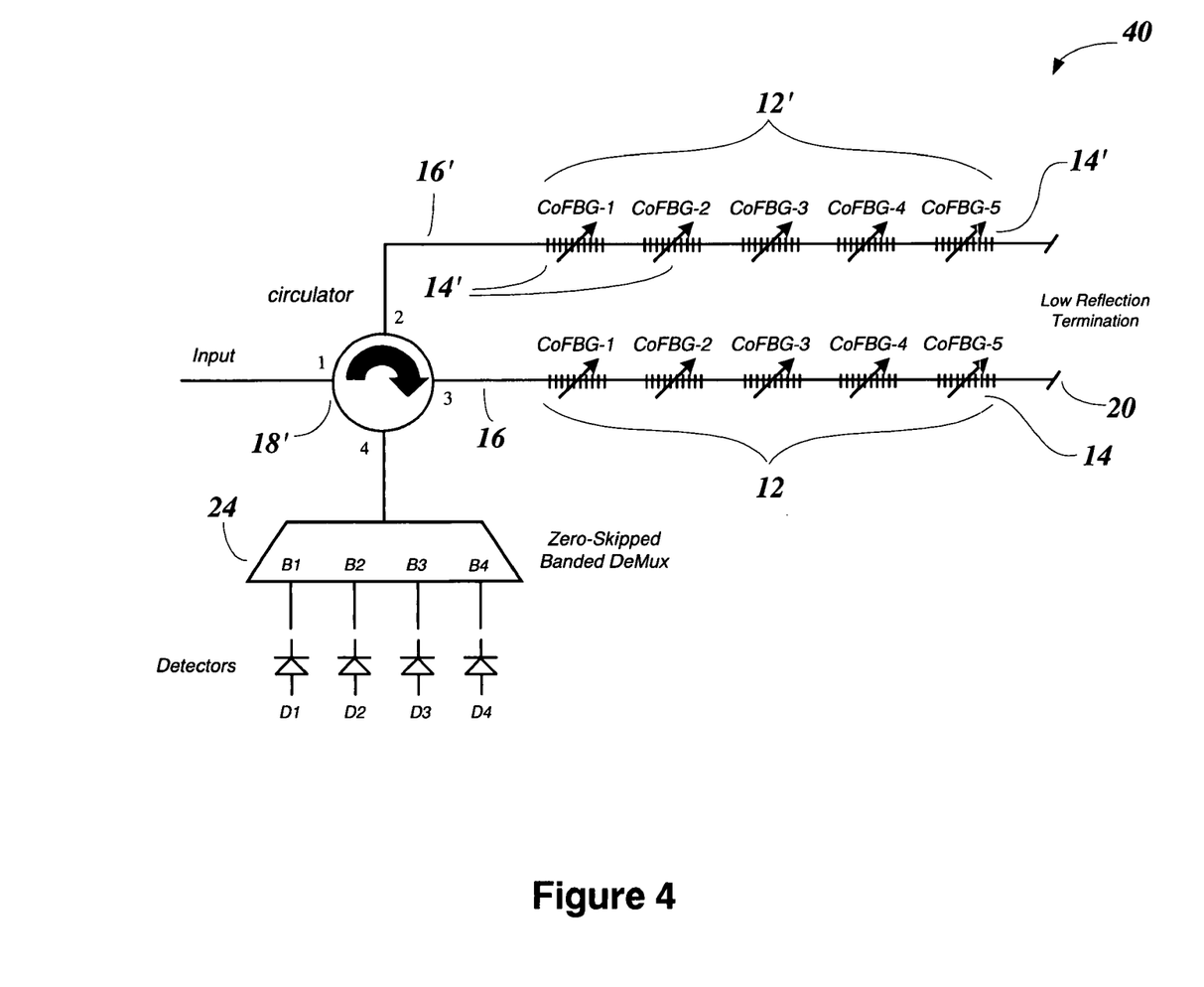
FIG. 4 is another OPM design to achieve even more accurate OSNR measurement based on the "optical double pass" concept.

FIG. 4 is a schematic diagram of another embodiment of an optical circuit 40 that is similar to that shown in FIG. 1 except with the addition of a second co-located FBG array 12' located in a second length of optical fiber 16' attached to another optical circulating port located in circulator 18. An input signal is first reflected by corresponding FBG's 14' in the top co-located FBG array 12' and then reflected by the bottom co-located FBG array 12 via the four-port circulator 18'. The "double pass" effect provides a much-improved overall filter spectrum. As a result of this arrangement, the power measurement error due to out-of-band noise rejection ratio becomes effectively insignificant. There are two modes of operation for this scheme. First, two co-located FBGs are switched simultaneously by attaching both co-located FBGs on the same switching mechanism. It should be noted that, in this instance, two co-located FBGs 14' and 14 may not necessarily have identical spectra. Alternatively, they can be switched in a non-synchronized fashion. In other words, all co-located FBGs are switched independently. In particular, by arranging switching pattern of all co-located FBGs in such a way that when one pair of co-located FBG (from top and bottom path) is being switched to the measurement point, the other co-located FBG pairs are switched to suppress the background noise. In this way, channelized power measurement (and hence channelized OSNR) can be realized.

Figure 5A:
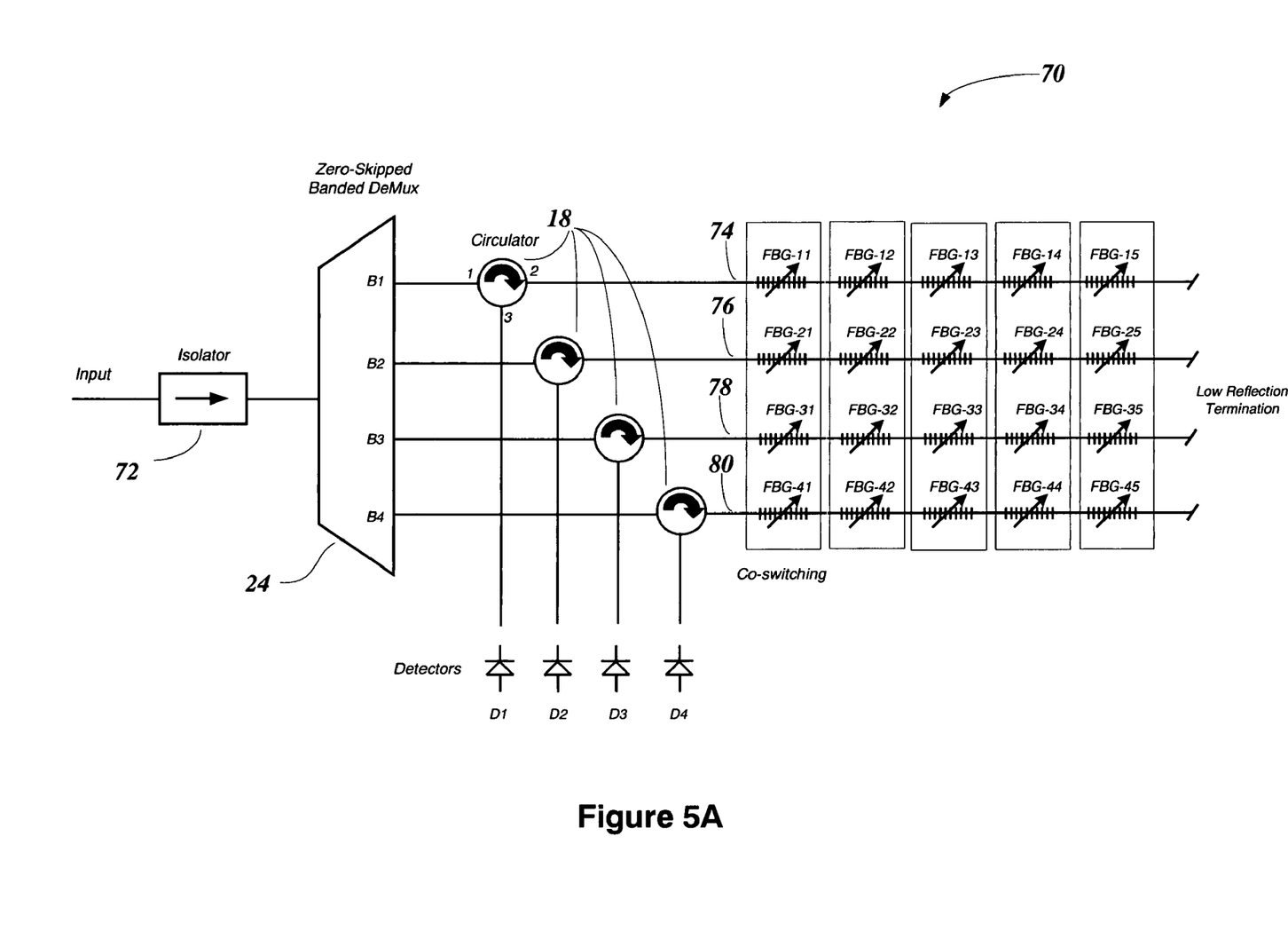
FIG. 5A is a further OPM design to improve OSNR measurement by placing four FBG arrays after a banded demultiplexer.

FIG. 5A shows another OPM optical circuit 70 where the channel select component (i.e. switchable FBGs) is now placed after the banded demultiplexer 24. In this embodiment, the switchable FBGs are arranged in series instead of being co-located. Specifically, circuit 70 includes an optical branching device 18 (preferably an optical circulator) connected to each of the outputs of the demultiplexer 24 and the second optical circulating port of each of the circulators are connected to an optical fiber 74, 76, 78 and 80, each having an array of five (5) switchable FBGs spatially separated along each fiber. The use of an optical isolator 72 is to eliminate any unwanted reflection from the banded demultiplexer 24. The major benefits of this arrangement are two-fold: firstly, the inter-band cross talk due to the nature of co-locating FBGs is eliminated. Secondly, the steep filtering requirement for the demultiplexer 24 is no longer necessary because any out-of-band signals will be terminated at the end of each switchable FBG arrays and not be routed to the detectors. In fact, the banded demultiplexer 24 can be replaced by an optical splitter provided that each FBG has sufficient out-of-band rejection ratio.

The present invention provides methods and devices for optical performance monitoring using co-located switchable fiber Bragg gratings (FBGs) in conjunction with a few detectors. This arrangement combines the merit of both tunable FBG filters and discrete detectors to achieve high spectral resolution, fast detection process and great dynamic range. By using parallel co-located FBGs in conjunction with a banded architecture, the tuning range of each FBG becomes much smaller (equivalent of ~0.08% strain). As a result, not only does the update speed of the spectral characteristics for each channel become much faster, but it effectively eliminates the concern of FBG long-term reliability as well.

Figure 5B:
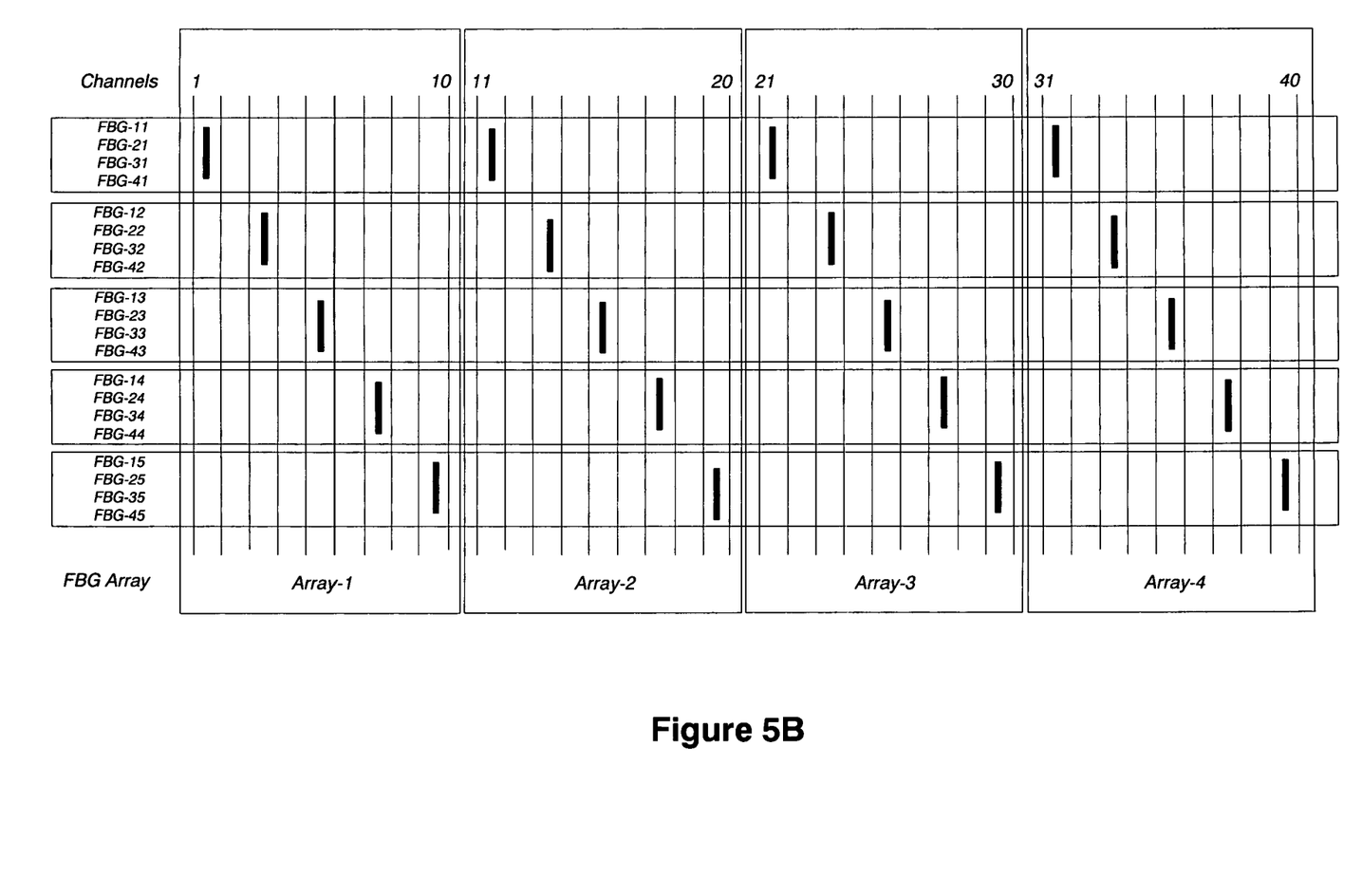
FIG. 5B is a is a graphical representation showing how the spectral characteristics is measured using a co-switching FBGs array and a banded architecture.

As shown in FIG. 5A, the FBG arrays must be co-attached to a common switching mechanism in such a way that the same switching pattern described in FIG. 2 can be achieved. FIG. 5B shows an example of such an arrangement. It can be seen that the previous co-located FBGs now become co-switched FBGs to follow the same switch pattern. However it will be understood that the switching pattern of FIG. 2, while preferred, is not essential and in fact any switching combination may be used.

Figure 6:
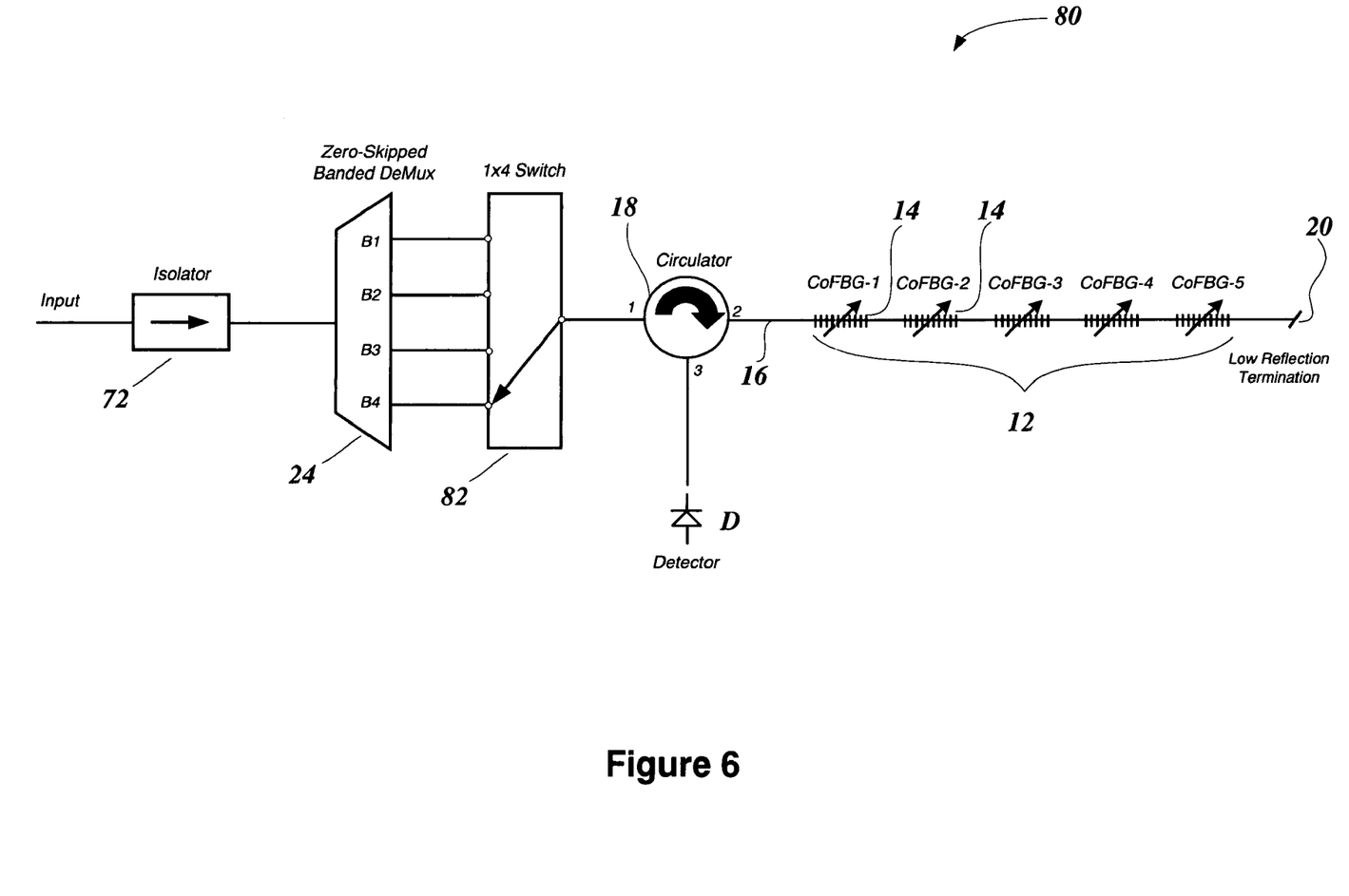
FIG. 6 is anther alternative OPM design to eliminate inter-band cross talk using single co-located FBG array in conjunction with a 1×4 optical switch.

FIG. 6 shows yet another optical circuit shown at 80 that combines the merits of preceding two embodiments shown in FIG. 1 and FIG. 5. This is done by incorporating a 1×4 optical switch 82 inserted between the banded demultiplexer 24 and the circulator 18. The introduction of optical switch 82 provides the benefit of using a single detector D and co-located FBG array 12, and eliminates the inter-band cross talk.

Figure 7:
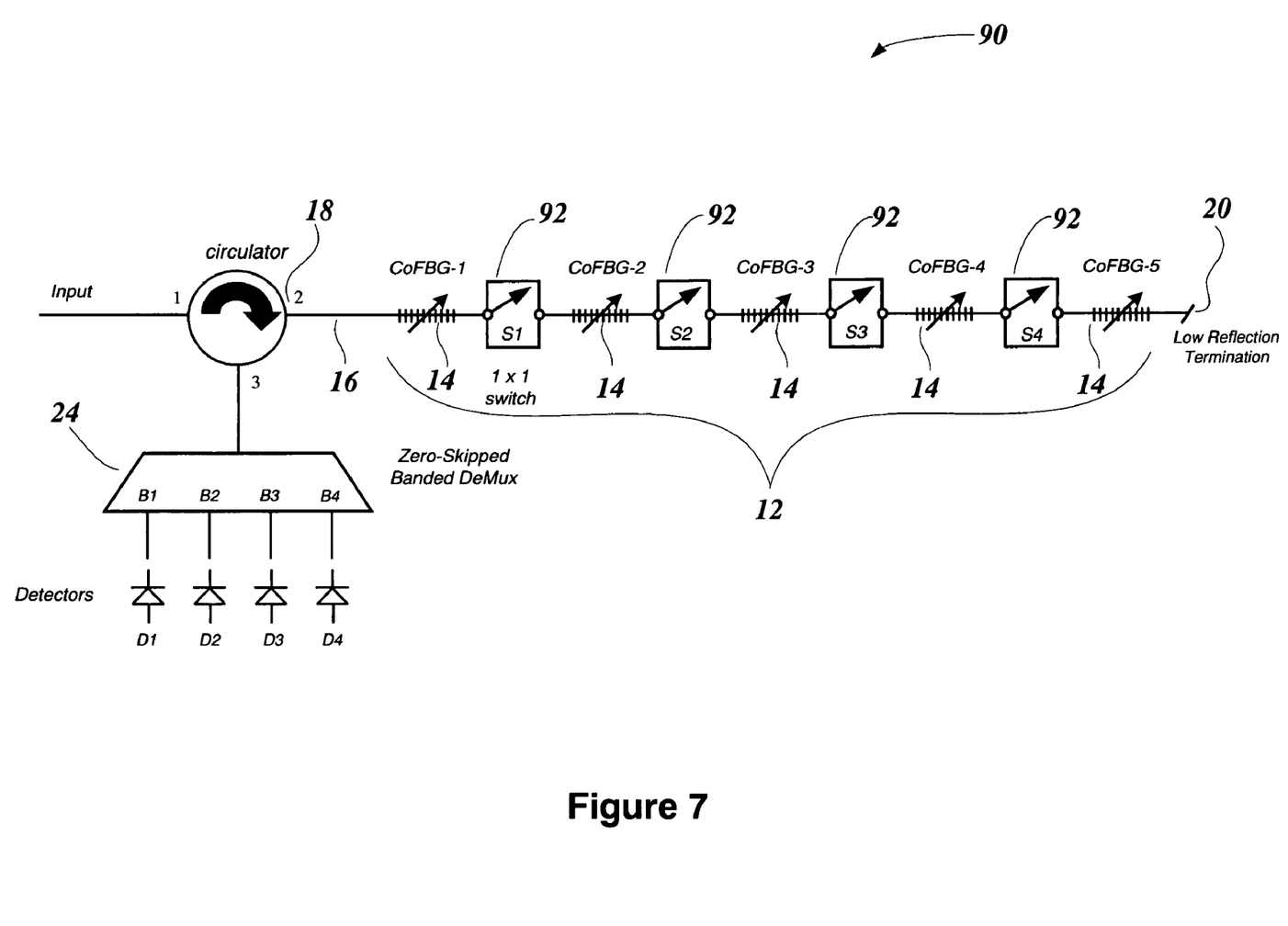
FIG. 7 is yet another alternative OPM design to eliminate intra-band cross talk using a 1×1 optical switch.

FIG. 7 shows still another optical circuit 90 that is similar to that shown in FIG. 1 except with the addition of a series of 1×1 optical switches 92 inserted between the co-located FBGs. A key difference between optical circuits shown in FIG. 6 and FIG. 7 is that the former eliminates the inter-band cross talk whereas the latter eliminates the intra-band cross talk. As a result of the circuit 90 shown in FIG. 7, the intra-band cross talk among co-located FBGs 14 is effectively separated (and hence corrected) by sequentially controlling each switch placed before each co-located FBGs. In addition, the optical circuit of FIG. 7 allows for the measurement of noise floor with a highly non-flat spectrum.

The present invention differs from the prior art in that it only uses a fractional amount of tuning otherwise required to cover the entire C-band. This is achieved by means of co-located channel selector filters and a banded architecture, allowing for high reliability, better performance, better manufacturability and lower cost. As a result of this unique architecture, not only does the update speed of spectral characteristics for each channel become much faster, but it can be produced at lower cost and is generally more compact.

While an optical circulator is the preferred optical branching device as shown in the circuits illustrated herein, it will be appreciated that other types of branching devices may be used which will be known to those skilled in the art, such as for example an optical coupler in conjunction with an optical isolator for the embodiments shown if FIGS. 1, 4 7, but not needed in the optical circuits shown in FIGS. 5a and 6. In addition, while discrete detectors are preferred as shown in FIG. 1, the detectors may be part of a single detector-array.

The circuits shown in FIGS. 1, 4 and 7 combine the merits of both tunable FBG filters and discrete detectors to achieve high spectral resolution, fast detection process and great dynamic range. By using parallel co-located FBGs in conjunction with a banded architecture, the tuning range of each FBG becomes much smaller (equivalent of ~0.08% strain). As a result, not only does the update speed of the spectral characteristics for each channel become much faster, but it effectively eliminates the concern of FBG long-term reliability as well.

Therefore, although the invention has been shown and described with respect to the exemplary embodiments as shown, it should be understood by those skilled in the art that the foregoing and various other changes, omissions and additions in the form and detail thereof may be made therein without departing from the spirit and scope of the invention.

As used herein, the terms "comprises" and "comprising" are to be construed as being inclusive and open ended, and not exclusive. Specifically, when used in this specification including claims, the terms "comprises" and "comprising" and variations thereof mean the specified features, steps or components are included. These terms are not to be interpreted to exclude the presence of other features, steps or components.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims.

REFERENCES CITED

U.S. PATENT DOCUMENTS

| | | |
|---|---|---|
| 6,504,976 | January 2003 | Polynkin et al. |
| 5,305,083 | April 1994 | Marianik et al. |
| 6,310,703 | October 2001 | Alavie et al. |
| 6,510,256 | January 2003 | Asseh et al. |

Other Publications

1. C. Miller et al., "Fabry-Perot tunable filters improve optical channel analyzer performance", Lightwave, 1999, pp. 71-75.
2. St. Schmid et al., "High-performance integrated acousto-optic channel analyzer", Tech. Dig. OFC'97, Dallas, Tex., 1997, TuC3, pp. 7-8.
3. C. Koeppen et al., "High resolution fiber grating optical network monitor", Tech. Dig. NFOEC' 98, September, 1998, Session 17, paper 2.

What is claimed is:

1. An optical performance monitor, comprising:
an optical isolator having an output optically coupled to an input of a means for demultiplexing the input optical signals into a pre-selected number of wavelength bands, each wavelength band containing a pre-selected number of wavelength channels, the optical isolator having an input optically coupled to the input optical signals, the means for demultiplexing the optical signals having a number of outputs equal to the pre-selected number of wavelength bands with each output being optically coupled into an associated optical branching device, each optical branching device having a first circulating port being optically coupled to a first end of an associated length of optical fiber, each optical branching device having an output port optically coupled to an associated detector;
each length of optical fiber having a fiber Bragg grating array including a the same number of spatially-separated fiber Bragg gratings, each of the fiber Bragg gratings having a different associated Bragg wavelength, the length of optical fiber having a second end being a low reflection termination;
tuning means attached to each of the spatially-separated fiber Bragg gratings for inducing a pre-selected amount of change in both fiber Bragg grating period and refractive index in each fiber Bragg grating for shifting the associated Bragg wavelengths of each of the fiber Bragg gratings among a pre-selected number (L) of positions, wherein when a pre-selected fiber Bragg grating in each length of optical fiber is switched to coincide with a pre-selected wavelength channel, the pre-selected wavelength channels in each fiber are reflected back through the optical branching device attached to each length of optical fiber and out through its output port into the associated detector connected thereto, whereupon the wavelength channels of each wavelength band are interrogated to determine pre-selected properties of the optical signals,
wherein each spatially-separated fiber Bragg grating in different optical fibers but in the same corresponding fiber positions is attached to a common tuning means such that all the fiber Bragg gratings in the same corresponding fiber positions are switched at the same time.

2. An optical performance monitor according to claim 1 wherein the means for demultiplexing the input optical signals is an optical band demultiplexer.

3. An optical performance monitor according to claim 1 wherein the pre-selected properties of the wavelength channels including wavelength channel identification, wavelength channel power and wavelength channel optical-signal-to-noise-ratio.

4. An optical performance monitor according to claim 1 wherein the optical branching device is an optical circulator.

5. An optical performance monitor according to claim 1 wherein the optical branching device includes an optical coupler.

6. An optical performance monitor according to claim 1 wherein the detectors are individual discrete detectors.

7. An optical performance monitor according to claim 1 wherein the detectors are part of a single detector-array.

8. An optical performance monitor according to claim 1 wherein the means for demultiplexing the input optical signals includes a fiber optic filter array including fiber optic branches with each fiber optic branch having fiber Bragg gratings, the fiber Bragg gratings in each fiber optic branch having Bragg wavelengths selected to transmit only one wavelength band at an output of each branch of the fiber optic branches, and wherein the output of each branch is optically coupled to an associated optical branching device so optical signals from each wavelength band are interrogated independently of all remaining wavelength bands.

9. An optical performance monitor according to claim 8 wherein the number of pre-selected number of wavelength bands is K, and wherein the fiber optic filter array includes a 1×K optic splitter having an input connected to the output port of the optical branching device and K output branches each having all pre-selected wavelength bands routed therein, wherein each of the K output branches includes a broadband fiber Bragg grating to transmit one of the wavelength bands and reflect all remaining wavelength bands followed by a narrowband fiber Bragg grating to provide a sharp filtering edge so that substantially square zero-skipped filtering is achieved at a boundary between the transmitted wavelength band and the reflected wavelength bands, and wherein each of the K output branches is optically coupled to one of the associated optical branching device, and wherein each of the K output branches transmits a different wavelength band than all the other K output branches so that all wavelength bands are output from the optical band demultiplexer.

10. An optical performance monitor according to claim 8 wherein the number of pre-selected number of wavelength bands is K, and wherein the fiber optic filter array includes multiple cascaded 1×2 optical splitters with an output of each 1×2 optical splitter connected to a broadband fiber Bragg grating followed by a narrowband fiber Bragg grating, wherein the output of each narrowband fiber Bragg grating is connected to an input of the next 1×2 optical splitter in the fiber optic array or to one of the associated optical branching device, wherein the total number of splitting stages is selected to give sufficient fiber optic branches so that all the pre-selected number of wavelength bands K are individually output from the fiber optic array to its associated detector.

11. A method of monitoring optical performance of optical signals in an optical fiber, comprising the steps of:
a) demultiplexing optical signals into a pre-selected number (K) of wavelength bands, each wavelength band containing a pre-selected number of wavelength channels;
b) directing the demultiplexed wavelength channels from each of the pre-selected number (K) wavelength bands into an associated optical branching device and into a length of optical fiber coupled thereto, each length of optical fiber having a fiber Bragg grating array including the same number of spatially-separated number of fiber Bragg gratings, each of the fiber Bragg gratings having a different associated Bragg wavelength and being tunable among a pre-selected number (L) of wavelength positions with each wavelength position coinciding with an associated pre-selected wavelength channel from the wavelength band routed into the length of optical fiber such that each fiber Bragg grating reflects its (L) pre-selected wavelength channels back through the optical branching device attached thereto, the length of optical fiber having a second end being a low reflection termination;
c) tuning both the period and refractive index of one of the fiber Bragg gratings in each of the optical fibers for shifting the associated Bragg wavelength of each fiber Bragg grating to coincide with an associated pre-selected wavelength channel from the pre-selected wavelength band such that the pre-selected fiber Bragg grating reflects the associated pre-selected wavelength channel back through its associated optical branching device, and detecting the reflected pre-selected wavelength channel from each wavelength band and interrogating the detected wavelength channels to determine pre-selected properties of the optical signals contained therein;
d) repeating step c) L-1 additional times until L wavelength channels in the pre-selected wavelength band in each length of optical fiber has been reflected back through the optical branching device; and
e) repeating steps c) and d) for each of the spatially-separated Bragg gratings in each length of optical fiber until all the wavelength channels have been detected;
f) repeating steps b), c) d) and e) for each of the pre-selected number (K) of wavelength bands until all the wavelength channels (N), given by N=MKL, are detected,
wherein each spatially-separated fiber Bragg grating in different optical fibers but in the same corresponding fiber positions is attached to a common tuning means such that all the fiber Bragg gratings in the same corresponding fiber positions are switched at the same time.

12. The method according to claim 11 wherein the optical branching device is an optical circulator.

13. The method according to claim 11 wherein the optical branching device is an optical coupler.

14. The method according to claim 11 wherein the step of detecting is performed using individual discrete detectors.

15. The method according to claim 11 wherein the step of detecting is performed using detectors which are part of a single detector-array.

16. The method according to claim 11 wherein the step of demultiplexing the optical signals includes splitting and reproducing the optical signals in all the pre-selected wavelength bands in a pre-selected number of fiber optic branches, and filtering the optical signals in each of the pre-selected fiber optic branches to transmit only one of the pre-selected wavelength bands and reflect all the other pre-selected wavelength bands, wherein each fiber optic branch transmits a different pre-selected wavelength band from all the others so that each of the wavelength bands are output from the pre-selected number of fiber optic branches.

17. The method according to claim 16 wherein the number of pre-selected wavelength bands is K, and wherein the fiber optic branches are formed using a 1×K optic splitter having an input connected to an output port of the optical branching device and K output branches each having all pre-selected wavelength bands routed therein, wherein each of the K output branches includes a broadband fiber Bragg grating to transmit one of the wavelength bands and reflect all remaining wavelength bands followed by a narrowband fiber Bragg grating to provide a sharp filtering edge so that substantially square zero-skipped filtering is achieved at a boundary between the transmitted wavelength band and the reflected wavelength bands, and wherein each of the K output branches is optically coupled to one of the associated optical branching device, and wherein each of the K output branches transmits a different wavelength band than all the other K output branches so that all wavelength bands are output from the optical band demultiplexer.

18. The method according to claim 16 wherein the number of pre-selected wavelength bands is K; and wherein the fiber optic branches are formed using at least one cascaded 1×2 optical splitters with an output of each 1×2 optical splitter connected to a broadband fiber Bragg grating followed by a narrowband fiber Bragg grating, wherein the output of each narrowband fiber Bragg grating is connected an input of the next 1×2 optical splitter in the fiber optic array or to one of the associated detectors, wherein the total number of splitting stages is selected to give sufficient fiber optic branches so that all the pre-selected number of wavelength bands K are individually output from the fiber optic array to an associated optical branching device.

19. An optical performance monitor, comprising:
an optical isolator having an output optically coupled to an input of a means for optically splitting the input optical signals, the optical isolator having an input optically coupled to the input optical signals, the means for splitting the optical signals having a number of outputs equal to a pre-selected number of wavelength bands, each wavelength band containing a pre-selected number of wavelength channels, with each output of said means for optically splitting the input optical signals being optically coupled into an associated optical branching device, each optical branching device having a first circulating port being optically coupled to a first end of an associated length of optical fiber, each optical branching device having an output port optically coupled to an associated detector;
each length of optical fiber having a fiber Bragg grating array including the same number of spatially-separated fiber Bragg gratings, each of the fiber Bragg gratings having a different associated Bragg wavelength, the length of optical fiber having a second end being a low reflection termination;
tuning means attached to each of the spatially-separated fiber Bragg gratings for inducing a pre-selected amount of change in both fiber Bragg grating period and refractive index in each fiber Bragg grating for shifting the associated Bragg wavelengths of each of the fiber Bragg gratings among a pre-selected number (L) of positions, wherein when a pre-selected fiber Bragg grating in each length of optical fiber is switched to coincide with a pre-selected wavelength channel, the pre-selected wavelength channels in each fiber are reflected back through the optical branching device attached to each length of optical fiber and out through its output port into the associated detector connected thereto, whereupon the wavelength channels of each wavelength band are interrogated to determine pre-selected properties of the optical signals,
wherein each fiber Bragg grating has a pre-selected out-of-band rejection ratio,
and wherein each spatially-separated fiber Bragg grating in different optical fibers but in the same corresponding fiber positions is attached to a common tuning means such that all the fiber Bragg gratings in the same corresponding fiber positions are switched at the same time.

20. An optical performance monitor according to claim 19 wherein the pre-selected properties of the wavelength channels including wavelength channel identification, wavelength channel power and wavelength channel optical-signal-to-noise-ratio.

21. An optical performance monitor according to claim 19 wherein the optical branching device is an optical circulator.

22. An optical performance monitor according to claim 19 wherein the means for optically spitting the input signals includes an optical coupler.

23. An optical performance monitor according to claim 19 wherein the detectors are individual discrete detectors.

24. An optical performance monitor according to claim 19 wherein the detectors are part of a single detector-array.

25. A method of monitoring optical performance of optical signals in an optical fiber, comprising the steps of:
a) optically splitting optical signals into a number of outputs equal to a pre-selected number (K) of wavelength bands, each wavelength band containing a pre-selected number of wavelength channels;
b) directing the optically splitted wavelength channels into an associated optical branching device and into a length of optical fiber coupled thereto, each length of optical fiber having a fiber Bragg grating array including the same number of spatially-separated number of fiber Bragg gratings, each of the fiber Bragg gratings having a different associated Bragg wavelength and being tunable among a pre-selected number (L) of wavelength positions with each wavelength position coinciding with an associated pre-selected wavelength channel from the wavelength band routed into the length of optical fiber such that each fiber Bragg grating reflects its (L) pre-selected wavelength channels back through the optical branching device attached thereto, the length of optical fiber having a second end being a low reflection termination;
c) tuning both the period and refractive index of one of the fiber Bragg gratings in each of the optical fibers for shifting the associated Bragg wavelength of each fiber Bragg grating to coincide with an associated pre-selected wavelength channel from the pre-selected wavelength band such that the pre-selected fiber Bragg grating reflects the associated pre-selected wavelength channel back through its associated optical branching device, and detecting the reflected pre-selected wavelength channel from each wavelength band and interrogating the detected wavelength channels to determine pre-selected properties of the optical signals contained therein;
d) repeating step c) L-1 additional times until L wavelength channels in the pre-selected wavelength band in each length of optical fiber has been reflected back through the optical branching device; and
e) repeating steps c) and d) for each of the spatially-separated Bragg gratings in each length of optical fiber until all the wavelength channels have been detected;
f) repeating steps b), c) d) and e) for each of the pre-selected number (K) of wavelength bands until all the wavelength channels (N), given by N=MKL, are detected,
wherein each spatially-separated fiber Bragg grating in different optical fibers but in the same corresponding fiber positions is attached to a common tuning means such that all the fiber Bragg gratings in the same corresponding fiber positions are switched at the same time.

26. The method according to claim 25 wherein the optical branching device is an optical circulator.

27. The method according to claim 25 wherein the step of optically splitting optical signals is performed using an optical coupler.

28. The method according to claim 25 wherein the step of detecting is performed using individual discrete detectors.

29. The method according to claim 25 wherein the step of detecting is performed using detectors which are part of a single detector-array.

* * * * *